United States Patent Office 3,410,873
Patented Nov. 12, 1968

3,410,873
B-HOMO-19-NOR-PREGNENE, 3,20-DIONES
AND DERIVATIVES THEREOF
John A. Edwards, Palo Alto, Calif., assignor to Syntex
Corporation, Panama, Panama, a corporation of
Panama
No Drawing. Filed July 23, 1965, Ser. No. 474,467
21 Claims. (Cl. 260—340.5)

ABSTRACT OF THE DISCLOSURE

Novel B-homo-19-nor-$\Delta^4$ and $\Delta^{5(10)}$-pregnene-3,20-diones and B-homo-19-nor-$\Delta^{4,9(10)}$-pregnadiene-3,20-diones useful as anti-inflammatory agents.

---

This invention relates to novel cyclopentanopolyhydrophenanthrene derivatives and to processes for the preparation thereof.

More particularly, this invention relates to novel B-homo-19-nor-$\Delta^4$- and $\Delta^{5(10)}$-pregnene-3,20-diones represented by the general formula:

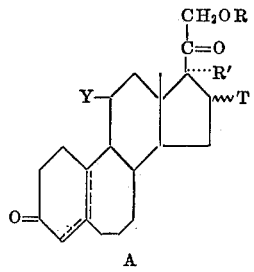

A and also to novel B-homo-19-nor-$\Delta^{4,9(10)}$-pregnadiene-3, 20-diones represented by the general formula:

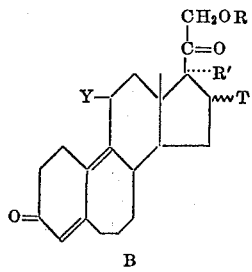

B

In these formulas R represents hydrogen or an acyl group; $R^1$ represents a hydroxyl group; T represents hydrogen, $\alpha$-hydroxyl, $\alpha$-acyloxy, $\alpha$-methyl or $\beta$-methyl; $R^1$ and T taken together can also represent the grouping:

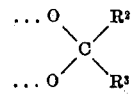

wherein $R^2$ represents hydrogen or a lower alkyl group, such as methyl, ethyl, propyl, butyl, or the like, and $R^3$ represents hydrogen, a lower alkyl group, such as methyl, or an aryl (including alkaryl and aralkyl) group containing up to 8 carbon atoms, inclusive, such as phenyl, tolyl, xylyl, benzyl, or the like; Y represents hydrogen, a $\beta$-hydroxyl group or a keto group and the dotted lines in Formula A indicate that there is one double bond at either the 4(5)- or the 5(10)-position.

The acyl and acyloxy groups referred to herein are preferably derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and $\beta$-chloropropionate.

The novel B-homo steroids represented by Formulas A and B hereinabove are cortical hormones having anti-inflammatory activity and can be used topically in the treatment of skin disorders, such as psoriasis and allergic dermatitis. They also have anti-androgenic, anti-gonadotrophic and anti-estrogenic activity.

Among the procedures which can be used to prepare the novel B-homo-19-nor-$\Delta^4$-pregnene-3,20-dione represented by Formula A are those represented schematically as follows:

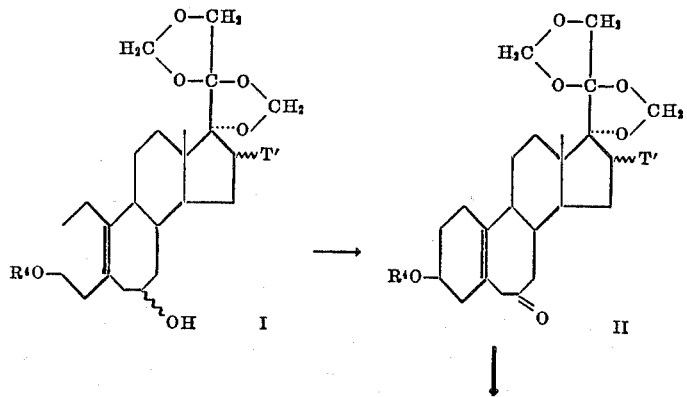

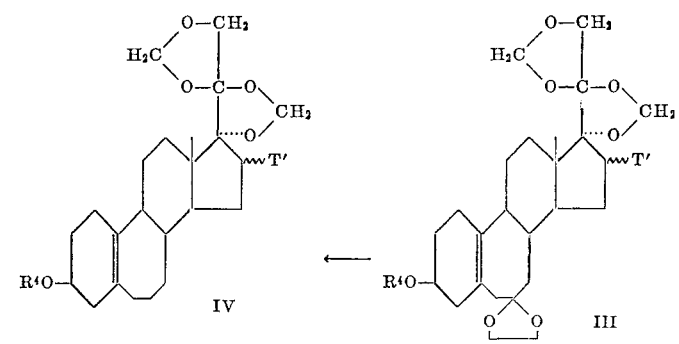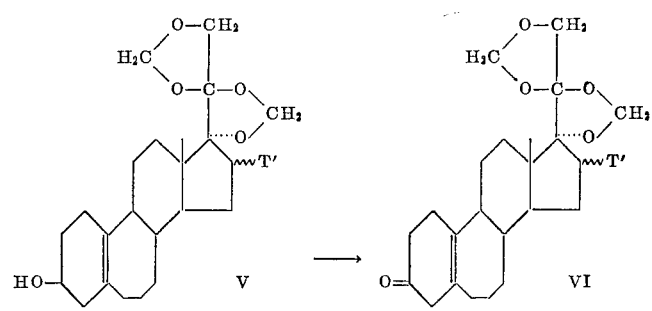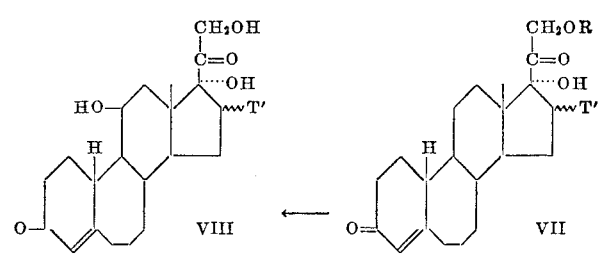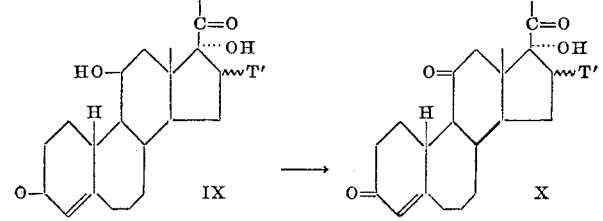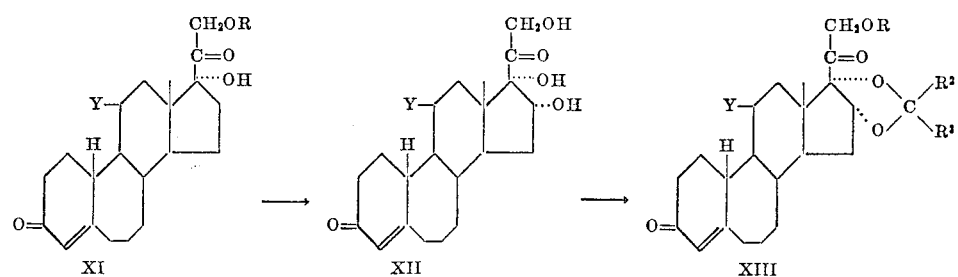

In these formulas, R has the same meaning as set forth hereinabove for Formulas I and II, $R^4$ represents an acyl group, and $T^1$ represents hydrogen, α-methyl or β-methyl.

In carrying out these procedures the free 7-hydroxyl group in the starting material, a B-homo-17,20;20,21-bismethylenedioxy-19-nor-$Δ^{5(10)}$-pregnene-3β,7(α or β)-diol 3-acylate, e.g., B-homo-17,20;20,21-bismethylenedioxy-19-nor-$Δ^{5(10)}$-pregnene-3β,7β-diol 3-acetate (I; $T^1$=hydrogen, $R^4$=acetyl) obtained as described in my copending U.S. patent application Ser. No. 423,566, filed Jan. 5, 1965, now abandoned, is oxidized, using chromium trioxide in pyridine, or the like, preferably at room temperature (about 25° C.) overnight, to give the corresponding 7-keto steroid, e.g., B-homo-17,20;20,21-bismethylenedioxy-19-nor-$Δ^{5(10)}$-pregnen-3β-ol-7-one 3-acetate (II; $T^1$=hydrogen, $R^4$=acetyl).

This 7-keto steroid is then reacted in known manner with a lower alkylene dithiol, such as ethane dithiol, propane dithiol, or the like, to give the corresponding 7-cycloalkylenedithio ketal, e.g., B-homo-17,20;20,21-bismethylenedioxy - 7-cycloethylenedithio-19-nor-$Δ^{5(10)}$-pregnen-3β-ol 3-acetate (III; $T^1$=hydrogen; $R^4$=acetyl).

The resulting 7-cycloalkylenedithio ketal, dissolved in a lower alkanol such as methanol, ethanol, or the like, is then refluxed with Raney nickel for from about 8 to about 24 hours, thus producing the corresponding 7-unsubstituted steroid, e.g., B-homo-17,20;20,21-bismethylenedioxy-19-nor-$Δ^{5(10)}$-pregnen-3β-ol 3-acetate (IV; $T^1$=hydrogen, $R^4$=acetyl).

Hydrolysis of the 3-acyl group in this 7-unsubstituted steroid, e.g., by refluxing it in aqueous methanolic potassium hydroxide, gives the corresponding free 3β-hydroxyl compound, e.g., B-homo-17,20;20,21-bismethylenedioxy-19-nor-$Δ^{5(10)}$-pregnen-3β-ol (V; $T^1$=hydrogen).

Oxidation of the 3-hydroxyl group in the thus-obtained free 3β-hydroxyl compound, using chromium trioxide in pyridine, or the like, in the manner described hereinabove, produces the corresponding 3-keto steroid, e.g., B-homo-17,20;20,21 - bismethylenedioxy - 19-nor-$Δ^{5(10)}$-pregnen-3-one (VI; $T^1$=hydrogen).

By heating the resulting $Δ^{5(10)}$-3-one with a concentrated solution of a strong acid, for example, aqueous concentrated formic acid of about 60% to about 90% strength, the corresponding $Δ^4$-3,20-dione, e.g., B-home-19-nor-$Δ^4$-pregnene-17α,21-diol-3,20-dione (VII; R and $T^1$=hydrogen), is produced.

The 21-hydroxyl group in the thus-obtained steroid can be acylated in known manner, e.g., by reaction with an acyl anhydride, such as acetic anhydride, or the like, in pyridine at room temperature overnight, to produce the corresponding 21-esters, e.g., B-homo-19-nor-$Δ^4$-pregnene-17α,21-diol-3,20-dione 21-acetate (VII; R=acetyl, $T^1$=hydrogen).

When a β-hydroxyl group or a keto group is desired at the 11-position, the free 21-ol (VII) can first be incubated with an oxygenating microorganism, such as *Cunninghamella bainieri* ATCC 9244, or the like, or with beef adrenal glands, in known manner, to introduce an 11β-hydroxyl group, thus producing, for example, B-homo-19-nor-$Δ^4$-pregnene-11β,17α,21-triol-3,20-dione (VIII; $T^1$=hydrogen).

After selective acylation of the free 21-hydroxyl group in the thus-obtained triol, e.g., by using approximately 1.1 equivalents of an acyl anhydride in pyridine at about 0° C., thus giving, for example, B-homo-19-nor-$Δ^4$-pregnene-11β,17α,21-triol-3,20-dione 21-acetate (IX; $R^4$=acetyl, T=hydrogen), the free 11β-hydroxyl group can be oxidized, by using chromium trioxide in pyridine, or the like in the manner described hereinabove, to give the corresponding 11-keto steroid, e.g., B-homo-19-nor-$Δ^4$-pregnene-17α,21-diol-3,11,20-trione 21-acetate (X; R=acetyl, $T^1$=hydrogen).

Hydrolysis of the 21-acyl group in this 11-keto steroid with aqueous methanolic potassium hydroxide in the manner described hereinabove gives the corresponding free 21-ol, e.g., B-homo-19-nor-$Δ^4$-pregnene-17α,21-diol-3,11,20-trione (X; R and $T^1$=hydrogen).

Introduction of a 16α-hydroxyl group can also be accomplished in known manner, e.g., by incubating the corresponding 16-unsubstituted steroid XI, such as B-homo-19-nor-$Δ^4$-pregnene-17α,21-diol-3,20-dione (XI; R and Y=hydrogen), with *Streptomyces roseochromogenus* ATCC 3347, or the like, thus giving the corresponding 16α,17α-diol, XII, e.g., B-homo-19-nor-$Δ^4$-pregnene-16α,17α,21-triol-3,20-dione (XII; Y=hydrogen).

Reaction of the thus-obtained 16α,17α-diol with an aldehyde or ketone, e.g., acetone, in known manner, for example as described in U.S. Patent No. 3,048,581 to Fried, produces the corresponding 16α,17α-isoalkylidenedioxy steroid, e.g., B-homo-16α,17α-isopropylidenedioxy-19-nor-$Δ^4$-pregnen-21-ol-3,20-dione (XIII; R and Y=hydrogen, $R^2$ and $R^3$=methyl), which can then, if desired, be acylated at the 21-position in the manner described hereinabove.

Among the procedures which can be used to prepare the novel B-homo-19-nor-$Δ^{5(10)}$-pregnene-3,20-diones of Formula A hereinabove, and the novel B-homo-19-nor-$Δ^{4, 9(10)}$-pregnadiene-3,20-diones of Formula B hereinabove are those represented schematically as follows:

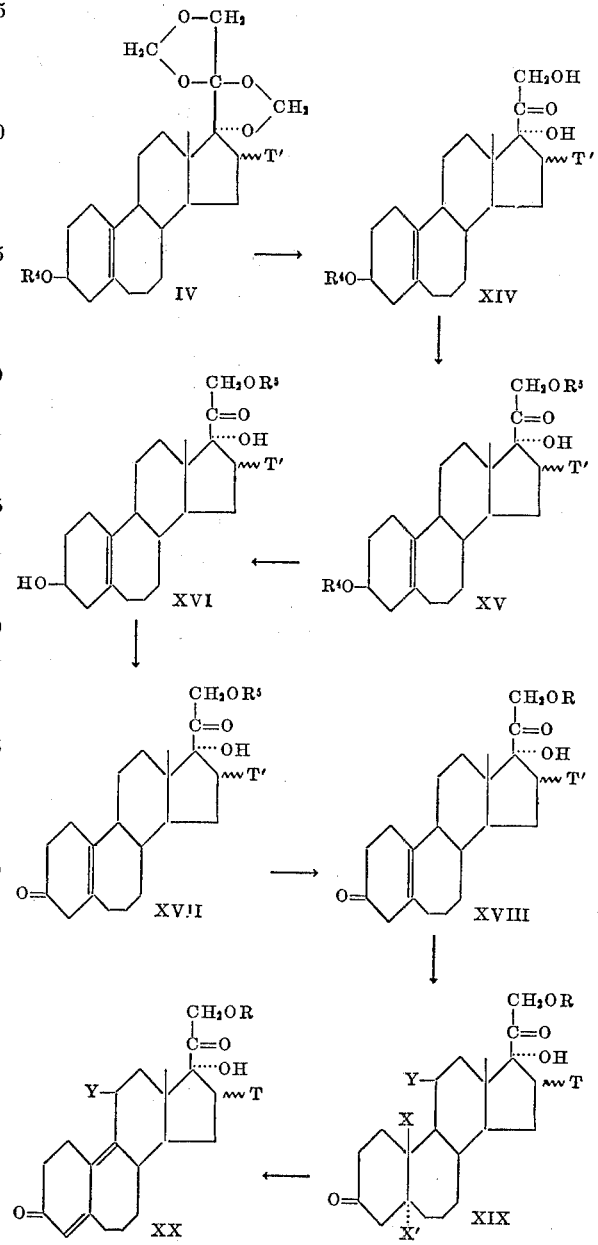

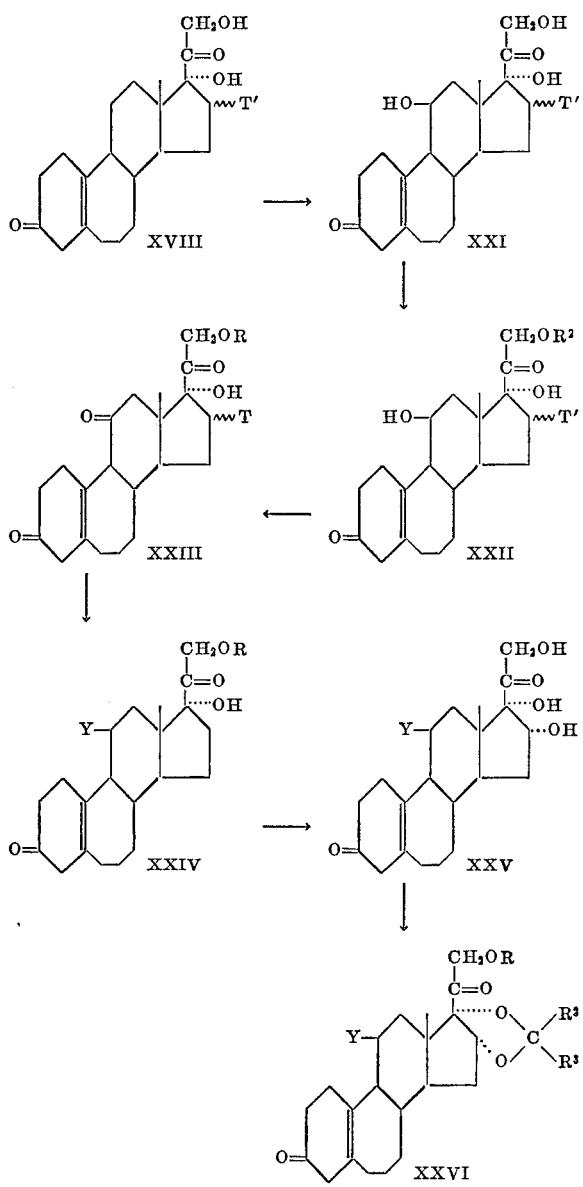

In these formulas R, $R^4$, T, $T^1$ and Y have the same meaning as set forth hereinabove for Formulas A and B, X represents chlorine, bromine or iodine, $X^1$ represents chlorine or bromine, and $R^5$ represents a tetrahydropyranyl group.

In carrying out this procedure the starting material, a B-homo-17,20;20,21-bismethylenedioxy - 19 - nor - $\Delta^{5(10)}$-pregnen-3β-ol-3-acylate, e.g., B - homo - 17,20;20,21 - bismethylenedioxy-19-nor-$\Delta^{5(10)}$-pregnen-3β-ol 3-acetate (IV; T=hydrogen, $R^4$=acetyl), is treated as described hereinabove for the regeneration of the cortical side chain in the corresponding 17,20;20,21-bismethylenedioxy - $\Delta^{5(10)}$ - 3-one, thus giving the corresponding $\Delta^{5(10)}$-pregnene-3β,17α, 21-triol-20-one 3-acylate, e.g., $\Delta^{5(10)}$-pregnene-3β,17α,21-triol-20-one 3-acylate (XIV; $T^1$=hydrogen, $R^4$=acetyl).

The thus-obtained $\Delta^{5(10)}$-17α,21-diol-20-one is then selectively etherified, using dihydropyran in the presence of a small amount of an acid catalyst, e.g., p-toluenesulfonic acid, boron trifluoride etherate, or the like, under substantially anhydrous conditions and preferably at from about room temperature to about 50° C. for from about 1 to about 72 hours, to give the corresponding 21-tetrahydropyranyl ether, e.g., B-homo-19-nor-21-tetrahydropyranyloxy-$\Delta^{5(10)}$-pregnene-3β,17α-diol-20 - one 3-acetate (XV; $R^4$=acetyl, $T^1$=hydrogen; $R^5$=tetrahydropyranyl).

The resulting 21-tetrahydropyranyloxy 3-acylate is then hydrolyzed with aqueous methanolic potassium hydroxide in the manner described hereinabove to give the corresponding free 3β-ol, e.g., B-homo-19-nor-21-tetrahydropyranyloxy-$\Delta^{5(10)}$-pregnene-3β,17α - diol - 20 - one (XVI; $T^1$=hydrogen; $R^5$=tetrahydropyranyl), which is then oxidized, using chromium trioxide in pyridine, or the like, in the manner described hereinabove, to give the corresponding 3-one, e.g., B-homo-19-nor-21-tetrahydropyranyloxy-$\Delta^{5(10)}$-pregnen-17α-ol-3,20-dione (XVII; $T^1$=hydrogen; $R^5$=tetrahydropyranyl).

The thus-obtained $\Delta^{5(10)}$-3-one, dissolved in aqueous lower alkanol, e.g., methanol, ethanol, or the like, is then reacted with oxalic acid at a temperature ranging from about room temperature to reflux temperature for from about 10 minutes to about 2 hours, or longer, to remove the tetrahydropyranyl group, thus giving the corresponding free 21-ol, e.g., B-homo-19-nor-$\Delta^{5(10)}$-pregnene-17α, 21-diol-3,20-dione (XVIII; R and $T^1$=hydrogen). If desired, the free 21-hydroxyl group in the thus-obtained steroid can be acylated, using an acyl anhydride in pyridine in the manner described hereinabove, thus giving the corresponding 21-acylate, e.g., B-homo-19-nor-$\Delta^{5(10)}$-pregnene-17α,21-diol-3,20-dione 21-acetate (XVIII; R=acetyl, $T^1$=hydrogen).

This $\Delta^{5(10)}$-3-one is then dihalogenated to produce the corresponding 5α,10β-dihalo steroid, e.g., B-homo-5α,10β-dibromo-19-nor-pregnane-17α,21-diol-3,20 - dione (XIX; R, T and Y=hydrogen, X and $X^1$=bromine).

Where the halogens introduced at the 5- and 10-positions are the same, i.e., two chlorine atoms or two bromine atoms, the reaction can be carried out as described in U.S. Patent No. 3,086,027 to Perelman et al., or U.S. Patent No. 3,139,446 using chlorine or bromine in liquid or gaseous form, or any other chlorinating or brominating agent or chlorine or bromine carrier which liberates chlorine as $Cl^+$, $Cl^-$ or bromine as $Br^+$, $Br^-$, such as N-chloroacetamide or N-chlorosuccinimide together with hydrogen chloride, N-bromoacetamide or N-bromosuccinimide together with hydrogen bromide, trimethyl ammonium bromide perbromide, pyridine perbromide hydrobromide, or the like, in an inert organic solvent such as pyridine or a substituted pyridine base, methylene dichloride, carbon tetrachloride, or the like.

Where the halogens introduced at the 5- and 10-carbon atoms are different, the reaction will be carried out as described in U.S. Patent No. 3,139,446 using a halogen halide, e.g., bromine chloride, iodine chloride, or the like, which can be generated in situ from a mixture of an N-haloamide or N-haloimide, such as N-chloro, N-bromo- or N-iodoacetamide or N-chloro, N-bromo- or N-iodosuccinimide, or the like, with hydrogen chloride or hydrogen bromide, e.g., mixtures of N-bromoacetamide and hydrogen chloride, N-iodosuccinimide and hydrogen chloride, and the like, in an inert organic solvent, such as one or more of those mentioned hereinabove.

The temperature at which this halogenation reaction is carried out will vary depending on the halogenating agent or halogen carrier used. Thus, where a halogenating agent or halogen carrier other than a mixture of an N-haloamide or -imide and a hydrogen halide is used, the reaction will generally be carried out at a temperature of 5° C. or lower, and preferably at from about −20° C. to about 0° C., although in certain cases temperatures up to room temperature can be employed. Where the halogenating agent is a mixture of an N-haloamide or -imide and a hydrogen halide, the reaction will preferably be carried out at a temperature of about −20° C. or less, e.g., temperatures as low as −80° C. can be employed.

The thus-obtained 5α,10β-dihalo steroid XIX is then admixed with a pyridine base solvent, such as pyridine itself, collidine, lutidine, or the like, and reacted at a temperature ranging from about 20° C. to about 30° C. or higher, and preferably at room temperature, under substantially anhydrous conditions, to split out two mols of hydrogen halide and give the corresponding $\Delta^{4,9(10)}$-diene, e.g., B-homo-19-nor-$\Delta^{4,9(10)}$-pregnadiene-17α,21-diol-3,20-dione (XX; R, T and Y=hydrogen).

When a β-hydroxyl group or a keto group is desired at the 11-position in the free 21-ol, said 21-ol (XVIII) can first be incubated with an oxygenation microorganism or with beef adrenal glands to introduce the 11β-hydroxyl group, thus producing, for example, B-homo-19-nor-$\Delta^{5(10)}$-pregnene-11β,17α,21-triol-3,20-dione (XXI; $T^1$=hydrogen), and then, following selective acylation of the free 21-hydroxyl group in the thus-obtained triol, using approximately 1.1 equivalents of an acyl anhydride in the manner described hereinabove, thus giving, for example, B-homo-19-nor-$\Delta^{5(10)}$-pregnene-11β,17α,21-triol-3,20-dione 21-acetate (XXII; $R^4$=acetyl, T=hydrogen), the free 11β-hydroxyl group can be oxidized using chromium trioxide in pyridine, or the like, in the manner described hereinabove, to give the corresponding 11-keto steroid, e.g., B-homo-19-nor-$\Delta^{5(10)}$-pregnene-17α,21-diol-3,11,20-trione 21-acetate (XXIII; R=acetyl, $T^1$=hydrogen).

Hydrolysis of the 21-acyl group in this 11-keto steroid with aqueous methanolic potassium hydroxide in the manner described hereinabove gives the corresponding free 21-ol.

Similarly, introduction of a 16α-hydroxyl group by incubation with an oxygenating microorganism into a 16-unsubstituted steroid, such as B-homo-19-nor-$\Delta^{5(10)}$-pregnene-17α,21-diol-3,20-dione (XXIV; R and Y=hydrogen) to give, for example, B-homo-19-nor-$\Delta^{5(10)}$-pregnene-16α,17α,21-triol-3,20-dione (XXV; Y=hydrogen), followed by reaction with an aldehyde or ketone to give the corresponding 16α,17α-isoalkylidenedioxy steroid, e.g., B-homo-16α,17α-isopropylidenedioxy-19-nor-$\Delta^{5(10)}$-pregnen-21-ol-3,20-dione (XXVI; R and Y=hydrogen, $R^2$ and $R^3$=methyl), can all be accomplished in the manner described hereinabove, and the thus-obtained 16α,17α-isoalkylidenedioxy free 21-ol can also be acylated at the 21-position in the manner described hereinabove.

In order that those skilled in the art can more fully understand the present invention, the following examples are set forth. These examples are given solely for the purpose of illustrating the invention, and should not be considered as expressing limitations unless so set forth in the appended claims.

Example I

A solution of 6 grams of B-homo-17,20;20,21-bismethylenedioxy-19-nor-$\Delta^{5(10)}$-pregnen-3β-ol-7-one 3-acetate. 120 cc. of pyridine was added to a mixture of 6 grams of chromium trioxide in 120 cc. of pyridine, and the resulting reaction mixture was then allowed to stand at room temperature (25° C.) overnight. Following this reaction period the reaction mixture was diluted with ethyl acetate and then filtered through Celite. The resulting filtrate was washed thoroughly with water and dried over anhydrous sodium sulfate and evaporated to dryness. Crystallization from acetone/hexane gave B-homo-17,20;20,21-bismethylenedioxy-19-nor-$\Delta^{5(10)}$-pregnen-3β-ol-7-one 3-acetate.

By repeating this procedure in every detail but one, namely, replacing B-homo-17,20;20,21-bismethylenedioxy-19-nor-$\Delta^{5(10)}$-pregnene-3β,7β-diol 3-acetate with B-homo-17,20;20,21-bismethylenedioxy-16α-methyl-19-nor-$\Delta^{5(10)}$-pregnene-3β,7α-diol 3-acetate and B-homo-17,20;20,21-bismethylenedioxy-16β-methyl-19-nor-$\Delta^{5(10)}$-pregnene-3β,7β-diol 3-acetate, the corresponding 7-ones, namely, B-homo-17,20;20,21-bismethylenedioxy-16α-methyl-19-nor-$\Delta^{5(10)}$-pregnen-3β-ol-7-one 3-acetate and B-homo-17,20;20,21-bismethylenedioxy-16β-methyl-19-nor-$\Delta^{5(10)}$-pregnen-3β-ol-7-one-3-acetate, respectively, were obtained.

Example II

A solution of 5 grams of B-homo-17,20;20,21-bismethylenedioxy-19-nor-$\Delta^{5(10)}$-pregnen-3β-ol-7-one 3-acetate in 100 cc. of glacial acetic acid containing 5 cc. of ethane dithiol was admixed with 4 cc. of a saturated solution of hydrogen chloride in acetic acid, and the resulting reaction mixture was then allowed to stand at room temperature for 2 hours. Following this reaction period the reaction mixture was admixed with water and then saturated with ethyl acetate. The resulting extract was washed with an aqueous 5% sodium bicarbonate solution, then with water, then dried over anhydrous sodium sulfate and finally evaporated to dryness. Recrystallization from diethyl ether/hexane gave B-homo-17,20;20,21-bismethylenedioxy-7-cycloethylenedithio-19-nor-$\Delta^{5(10)}$-pregnen-3β-ol 3-acetate.

This procedure was then repeated in every detail with one exception, namely, B-homo-17,20;20,21-bismethylenedioxy-19-nor-$\Delta^{5(10)}$-pregnen-3β-ol-7-one 3-acetate was replaced by the remaining 7-ones obtained as described in Example I hereinabove. In each case the corresponding 7-cycloethylenedithio derivatives, namely, B-homo-17,20;20,21-bismethylenedioxy-7-cycloethylenedithio-16α-methyl-19-nor-$\Delta^{5(10)}$-pregnen-3β-ol 3-acetate and B-homo-17,20;20,21-bismethylenedioxy-7-cycloethylenedithio-16β-methyl-19-nor-$\Delta^{5(10)}$-pregnen-3β-ol-3-acetate, respectively, were obtained.

Example III

A solution of 4 grams of B-homo-17,20;20,21-bismethylenedioxy-7-cycloethylenedithio-19-nor-$\Delta^{5(10)}$-pregnen-3β-ol-3-acetate in 3 liters of ethanol (previously distilled from Raney nickel) containing 50 grams of Raney nickel was refluxed for 6 hours. Following this reaction period the reaction mixture was filtered to remove Raney nickel which was then washed with hot ethanol and the washings added to the filtrate. The combined ethanol solution was then evaporated to dryness and the resulting residue was dissolved in chloroform. This chloroform solution was washed with dilute hydrochloric acid, then with aqueous sodium carbonate solution, and finally with water. Next, the solution was dried over anhydrous sodium sulfate and then evaporated to dryness. Recrystallization of the thus-obtained residue from acetone/hexane gave B-homo-17,20;20,21-bismethylenedioxy-19-nor-$\Delta^{5(10)}$-pregnen-3β-ol-3-acetate.

By repeating this procedure in every detail but one, namely, replacing B-homo-17,20;20,21-bismethylenedioxy-7-cycloethylenedithio-19-nor-$\Delta^{5(10)}$-pregnen-3β-ol 3-acetate with the remaining cycloethylenedithio derivatives prepared as described in Example II hereinabove, the corresponding 7-unsubstituted steroids, namely, B-homo-17,20;20,21-bismethylenedioxy-16α-methyl-19-nor-$\Delta^{5(10)}$-pregnen-3β-ol 3-acetate and B-homo-17,20;20,21-bismethylenedioxy-16β-methyl-19-nor-$\Delta^{5(10)}$pregnen-3β-ol-3-acetate, respectively, were obtained.

Example IV

A solution of one gram of B-homo-17,20;20,21-bismethylenedioxy-19-nor-$\Delta^{5(10)}$-pregnen-3β-ol 3-acetate in 50 cc. of methanol was admixed with a solution of 500 mg. of potassium hydroxide in 1 cc. of water, and the resulting mixture was refluxed for 3 hours. Following this reaction period, the reaction mixture was poured into ice water and the resulting precipitate was collected by filtration, washed with water until neutral, and dried. Recrystallization of the thus-obtained crude material from methylene dichloride/diethyl ether gave B-homo-17,20;20,21-bismethylenedioxy-19-nor-$\Delta^{5(10)}$-pregnen-3β-ol.

This procedure was then repeated with one exception, namely, B-homo-17,20;20,21-bismethylenedioxy-19-nor-$\Delta^{5(10)}$-pregnen-3β-ol-3-acetate was replaced by the remaining 3-acetates of Examples III hereinabove. In each case, the corresponding free 3β-ol, namely, B-homo-17,20;20,21-bismethylenedioxy-16α-methyl-19-nor-$\Delta^{5(10)}$-pregnen-3β-ol and B-homo-17,20;20,21-bismethylenedioxy-16β-methyl-19-nor-$\Delta^{5(10)}$-pregnen-3β-ol, respectively, was obtained.

Example V

B-homo-17,20;20,21-bismethylenedioxy-19-nor-$\Delta^{5(10)}$- pregnen-3β-ol was oxidized, using chromium trioxide in pyridine in the manner described in Example I hereinabove, thus giving B-homo-17,20;20,21-bismethylenedioxy-19-nor-$\Delta^{5(10)}$-pregnen-3-one.

By repeating this procedure using the remaining free 3β-ols prepared as described in Example IV hereinabove as the steroid materials, the corresponding 3-ones, namely, B - homo-17,20;20,21-bismethylenedioxy-16α-methyl-19-nor-$\Delta^{5(10)}$-pregnen - 3 - one and B-homo-17,20;20,21-bismethylenedioxy - 16β-methyl-19-nor-$\Delta^{5(10)}$-pregnen-3-one, respectively, were obtained.

Example VI

A solution of one gram of B-homo-17,20;20,21-bismethylenedioxy-19-nor-$\Delta^{5(10)}$-pregnen-3-one in 20 cc. of aqueous 60% formic acid was heated on a steam bath for one hour. Following this reaction period the reaction mixture was cooled to room temperature and diluted with water. The thus-formed precipitate was collected by filtration, washed with water until neutral and then recrystallized from acetone/hexane, thus giving B-homo-19-nor-$\Delta^4$-pregnene-17α,21-diol-3,20-dione.

By repeating this procedure using the remaining 3-ones prepared as described in Example V hereinabove as the steroid starting materials, the corresponding $\Delta^4$-3,20-diones, namely, B - homo-16α-methyl-19-nor-$\Delta^4$-pregnene-17α,21-diol-3,20-dione and B-homo-16β-methyl-19-nor-$\Delta^4$-pregnene-17α,21-diol - 3,20 - dione, respectively, were obtained.

Example VII

A mixture of one gram of B-homo-19-nor-$\Delta^4$-pregnene-17α,21-diol-3,20-dione, 4 cc. of pyridine and 2 cc. of acetic anhydride was allowed to stand at room temperature overnight, then poured into ice water. The resulting precipitate was collected by filtration, washed with water and dried. Crystallization from acetone/hexane gave B-homo - 19 - nor-$\Delta^4$-pregnene-17α,21-diol-3,20-dione 21-acetate.

This procedure was then repeated using the remaining 3,20-diones prepared as described in Example VI hereinabove as the steroid starting materials, thus giving B-homo - 16α-methyl-19-nor-$\Delta^4$-pregnene-17α,21-diol-3,20-dione 21-acetate and B-homo-16β-methyl-19-nor-$\Delta^4$-pregnene-17α,21-diol-3,20-dione 21-acetate.

Similarly, by replacing acetic anhydride with propionic anhydride, cyclopropionic anhydride, β-chloropropionic anhydride, butyric anhydride, caproic anhydride and enanthic anhydride, respectively, the corresponding 21-propionates, -cyclopropionates, -β-chloropropionates, -butyrates, -caproates and -enanthates, respectively, were obtained.

Example VIII

To 340 cc. of a culture prepared by inoculating an aqueous medium containing 2% by weight of peptone and 5% by weight of corn syrup with a vegetating growth of *Cunninghamella bainieri* ATCC 9244 in the same medium, and stirring at room temperature, with aeration for 24 hours, there was added 10 cc. of an aqueous 1% ethanolic solution of B-homo-19-nor-$\Delta^4$-pregnene-17α,21-diol-3,20-dione. The resulting mixture was then stirred, with aeration, for 24 hours at room temperature.

The thus-obtained steroid product was then removed from the incubation medium by extraction with methylene chloride, and the resulting extract was washed with water, dried over anhydrous sodium sulfate, filtered, and then concentrated to a small volume under reduced pressure. The resulting concentrate was adsorbed on a column containing a mixture of equal parts by weight of silica gel and Celite which had previously been washed with methylene chloride, and elution with methylene chloride/acetone (80:20 respectively by volume) followed by crystallization from acetone/hexane, gave B-homo-19-nor-$\Delta^4$-pregnene-11β,17α,21-triol-3,20-dione.

By repeating this procedure in every detail but one, namely, replacing B-homo-19-nor-$\Delta^4$-pregnene-17α,21-diol-3,20-dione with the remaining 3,20-diones prepared as described in Example VI hereinabove, the corresponding 11β-hydroxy steroids, namely, B-homo-16α-methyl-19-nor-$\Delta^4$-pregnene-11β,17α,21-triol - 3,20 - dione and B-homo-16β-methyl-19-nor-$\Delta^4$-pregnene - 11β,17α,21 - triol-3,20-dione, respectively, were obtained.

Example IX

B-homo-19-nor-$\Delta^4$-pregnene-11β,17α,21-triol-3,20-dione was acetylated in the manner described in Example VII hereinabove with these exceptions, namely, 1.1 equivalents of acetic anhydride were employed per equivalent of steroid and the reaction was carried out at 0° C. for 4 hours, thus giving B-homo-19-nor-$\Delta^4$-pregnene-11β,17α,21-triol-3,20-dione-21-acetate.

By repeating this procedure using the remaining 11β-hydroxy steroids prepared as described in Example VIII hereinabove, the corresponding 21-acetates, namely, B-homo-16α-methyl-19-nor-$\Delta^4$-pregnene-11β,17α,21-triol - 3,20-dione 21-acetate and B-homo-16β-methyl-19-nor-$\Delta^4$-pregnene-11β,17α,21-triol-3,20-dione - 21 - acetate, respectively, were obtained.

Similarly, by replacing acetic anhydride with equivalent amounts of the remaining anhydrides mentioned in Example VII hereinabove, the corresponding 21-monoesters were obtained.

Example X

B-homo-19-nor-$\Delta^4$-pregnene-11β,17α,21-triol-3,20-dione 21-acetate was oxidized with chromium trioxide in pyridine in the manner described in Example I hereinabove to give B-homo-19-nor-$\Delta^4$-pregnene-17α,21-diol-3,11,20-trione 21-acetate.

By repeating this procedure using the remaining 11β-ol 21-acetates prepared as described in Example IX hereinabove, the corresponding 11-keto 21-acetates, namely, B-homo-16α-methyl-19-nor-$\Delta^4$-pregnene-17α,21 - diol - 3,11,20-trione 21-acetate and B-homo-16β-methyl-19-nor-$\Delta^4$-pregnene-17α,21-diol-3,11,20-trione 21 acetate, respectively, were obtained.

Similarly, by using the remaining 11β-ol 21-acylates prepared as described in Example XI hereinabove, the corresponding 11-keto 21-acylates were obtained.

Example XI

B-homo-19-nor-$\Delta^4$-pregnene-17α,21-diol - 3,20 - trione 21-acetate was refluxed with potassium hydroxide in methanol in the manner described in Example IV hereinabove, thus giving B-homo-19-nor-$\Delta^4$-pregnene-17α,21-diol-3,11,20-trione.

By repeating this procedure using B-homo-16α-methyl-19-nor-$\Delta^4$-pregnene-17α,21-diol-3,11,20-trione 21-acetate and B-homo-16β-methyl-19-nor-$\Delta^3$-pregnene-17α,21-diol-3,11,20-trione 21 acetate as the steroid starting materials, the corresponding free 21-ols were obtained.

Example XII

By esterifying the free 21-hydroxyl group in B-homo-19-nor-$\Delta^4$-pregnene - 17α,21 - diol - 3,11,20 - trione with propionic anhydride, cyclopentylpropionic anhydride, β-chloropropionic anhydride, butyric anhydride, caproic anhydride and enanthic anhydride, respectively, in the manner described in Example VII hereinabove, the corresponding 21 - propionate, -cyclopentylpropionate, β - chloropropionate, -butyrate, -caproate and -enanthate, respectively, were obtained.

Example XIII

A culture of *Streptomyces roseochromogenus* ATCC 3347 was prepared in an inclined agar medium containing 1% by weight of glucose and 1% by weight of yeast extract. One cc. of a suspension of this culture was then used to inoculate each of a series of 250 cc. flasks which contained 50 cc. of a sterilized aqueous medium containing 2% by weight of peptone and 5% by weight of corn syrup. The resulting mixtures were then incubated, with agitation and aeration, for 48 hours at room temperature. Following this incubation period 10 mg. of B-homo-19-nor-$\Delta^4$-pregnene-17α,21-diol-3,20-dione were added to each flask containing the vegetating cultures, and the resulting mixtures were stirred for 72 hours with aeration. Next, the incubated mixtures were combined and extracted with methylene dichloride and the resulting extract was washed with water, dried over anhydrous sodium sulfate, filtered and evaporated to dryness under reduced pressure. Purification of the residue by chromatography on silica gel gave B-homo-19-nor-$\Delta^4$-pregnene-16α,17α,21-triol-3,20-dione.

By repeating this procedure in every detail but one, namely, replacing B - homo - 19-nor-$\Delta^4$-pregnene-17α,21-diol-3,20-dione with B-homo-19-nor-$\Delta^4$-pregnene-11β,17α,21 - triol-3,20-dione and B-homo-19-nor-$\Delta^4$-pregnene-17α,21-diol-3,11,20-trione, respectively, the corresponding 16α-hydroxylated steroids, namely, B-homo-19-nor-$\Delta^4$-pregnene-11β,16α,17α,21-tetrol-3,20-dione and B-homo-19-nor-$\Delta^4$ - pregnene-16α,17α,21-triol-3,11,20-trione, respectively, were obtained.

Example XIV

A solution of one gram of B-homo-19-nor-$\Delta^4$-pregnene-16α,17α,21-triol-3,20-dione in 120 cc. of acetone was admixed with 30 drops of aqueous 70% perchloric acid, and the resulting reaction mixture was allowed to stand at room temperature for one hour. Following this reaction period, 30 drops of pyridine were added and the resulting solution was then evaporated to dryness under reduced pressure. The resulting residue was admixed with 30 cc. of water, and the resulting solution was then extracted several times with ethyl acetate. The combined extract was washed with water until neutral, dried over anhydrous sodium sulfate and evaporated to dryness. The resulting residue was triturated with methanol and then recrystallized from methanol to give B-homo-16α,17α-isopropylidenedioxy-19-nor-$\Delta^4$-pregnene-21-ol-3,20-dione.

By repeating this procedure using the remaining 16α,17α-diols prepared as described in Example XIII hereinabove, the corresponding acetonides, namely, B-homo-16α,17α - isopropylidenedioxy-19-nor-$\Delta^4$-pregnene-11β,21-diol-3,20-dione and B-homo-16α,17α-isopropylidenedioxy-19-nor-$\Delta^4$-pregnen-21-ol-3,11,20-trione, respectively, were obtained.

Example XV

B - homo - 16α,17α - isopropylidenedioxy - 19-nor-$\Delta^4$-pregnen-21-ol-3,20-dione was esterified, using acetic anhydride in pyridine, in the manner described in Example VII hereinabove, thus giving B-homo-16α,17α-isopropylidenedioxy-19-nor-$\Delta^4$-pregnen-21-ol-3,20-dione 21-acetate.

By repeating this procedure using the remaining acetonides prepared as described in Example XIV hereinabove, the corresponding 21-esters, namely, B-homo-16α,17α-isopropylidenedioxy - 19 - nor-$\Delta^4$-pregnene-11β,21-diol-3,20-dione 21-acetate and B-homo 16α,17α-isopropylidenedioxy-19-nor-$\Delta^4$-pregnen-21-ol-3,11,20-trione 21-acetate, respectively, were obtained.

Similarly, by replacing acetic anhydride with the remaining acyl anhydrides used in Example VII hereinabove, the corresponding 21-monoesters were obtained.

Example XVI

B - homo - 17,20;20,21 - bismethylenedioxy - 19 - nor-$\Delta^{5(10)}$-pregnen-3β-ol 3-acetate was hydrolyzed, using aqueous formic acid in the manner described in Example VI hereinabove, thus giving B-homo-19-nor-$\Delta^{5(10)}$-pregnene-3β,17α,21-triol-20-one 3-acetate.

By repeating this procedure using, as the steroid starting materials, B - homo - 17,20;20,21-bismethylenedioxy-16α-methyl-19-nor-$\Delta^{5(10)}$-pregnen-3β-ol 3-acetate and B-homo - 17,20;20,21 - bismethylenedioxy - 16β-methyl-19-nor-$\Delta^{5(10)}$-pregnen-3β-ol-3-acetate, the corresponding unetherified steroids, namely, B-homo-6α-methyl-19-nor-$\Delta^{5(10)}$ - pregnene-3β,17α,21-triol-20-one 3-acetate and B-homo - 16β - methyl - 19-nor-$\Delta^{5(10)}$-pregnene-3β,17α,21-triol-20-one 3-acetate, respectively, were obtained.

Example XVII

To a solution of one gram of B-homo-19-nor-$\Delta^{5(10)}$-pregnene-3β,17α,21-triol-20-one 3-acetate in 25 cc. of benzene there was added 4 cc. of dihydropyran. Next, approximately 5 cc. of the mixture of benzene and dihydropyran was distilled off to remove moisture and the remaining mixture was then cooled to room temperature. To the cooled mixture there was then added 0.1 gram of p-toluenesulfonic acid and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The dry residue was chromatographed by passing it, dissolved in hexane, through a column of neutral alumina, thus giving B - homo - 19-nor-21-tetrahydropyranyloxy-$\Delta^{5(10)}$-pregnene-3β,17α-diol-20-one 3-acetate.

By reacting this procedure using the remaining free 21-ols prepared as described in Example XVI hereinabove, the corresponding 21-tetrahydropyranyl ethers, namely, B - homo - 16α - methyl-19-nor-21-tetrahydropyranyloxy-$\Delta^{5(10)}$-pregnene-3β,17α-diol-20-one 3-acetate and B-homo-16β - methyl - 19 - nor-21-tetrahydropyranyloxy-$\Delta^{5(10)}$-pregnene-3β,17α-diol-20-one-3-acetate, respectively, were obtained.

Example XVIII

B - homo - 19 - nor - 21-tetrahydropyranyloxy-$\Delta^{5(10)}$-pregnene-3β,17α-diol-20-one 3-acetate was hydrolyzed, using aqueous methanolic potassium hydroxide, in the manner described in Example IV hereinabove, thus giving B - homo - 19 - nor-21-tetrahydropyranyloxy-$\Delta^{5(10)}$-pregnene-3β,17α-diol-20-one.

This procedure was then repeated using the remaining 21-tetrahydropyranyloxy 3-acetates prepared as described in Example XVI hereinabove as the steroid starting materials, thus giving the corresponding free 3β-ols.

Example XIX

B - homo - 19 - nor - 21-tetrahydropyranyloxy-$\Delta^{5(10)}$-pregnene-3β,17α-diol-20-one was oxidized, using chromium trioxide in pyridine, in the manner described in Example I hereinabove, thus giving B-homo-19-nor-21-tetrahydropyranyloxy-$\Delta^{5(10)}$-pregnen-17α-ol-3,20-dione.

This procedure was then repeated in every detail but one, namely, B - homo - 16α - methyl-19-nor-21-tetrahydropyranyloxy-$\Delta^{5(10)}$-pregnene-3β,17α-diol-20-one and B-homo - 16β - methyl - 19-nor-21-tetrahydropyranyloxy-$\Delta^{5(10)}$ - pregnene - 3β,17α-diol-20-one, respectively, were used as the steroid starting materials. In each case, the corresponding 3-ones, namely, B-homo-16α-methyl-19-nor - 21-tetrahydropyranyloxy-$\Delta^{5(10)}$-pregnen-17α-ol-3,20-dione and B-homo-16β-methyl-19-nor-21-tetrahydropyranyloxy-$\Delta^{5(10)}$-pregnen-17α-ol-3,20-dione, respectively, were obtained.

Example XX

One gram of B-homo-19-nor-21-tetrahydropyranyloxy-$\Delta^{5(10)}$-pregnen-17α-ol-3,20-dione in 100 ml. of a 1% solution of oxalic acid in methanol/water (4:1, respectively, by volume) was reacted for one hour at room temperature. Following this reaction period the reaction mixture was poured into ice water and then extracted with methylene chloride. The resulting extract was washed with water until neutral, then dried over anhydrous sodium sulfate and evaporated to dryness. Crystallization from acetone/hexane gave B-homo-19-nor-$\Delta^{5(10)}$-pregnene-17α-21-diol-3,20-dione.

By repeating this procedure using the remaining 21- tetrahydropyranyloxy-3-ones prepared as described in Example XIX hereinabove, the corresponding free 21-ols, namely, B-homo-16α-methyl-19-nor-Δ$^{5(10)}$-pregnene - 17α, 21-diol-3,20-dione and B-homo-16β-methyl-19-nor-Δ$^{5(10)}$-pregnene-17α,21-diol-3,20-dione, respectively, were obtained.

Example XXI

B-homo-19-nor-Δ$^{5(10)}$ - pregnene - 17α,21 - diol - 3,20-dione was esterified, using acetic anhydride in pyridine in the manner described in Example VII hereinabove, thus giving B - homo-19-nor-Δ$^{5(10)}$-pregnene-17α,21-diol-3,20-dione 21-acetate.

By repeating this procedure using the remaining free 21-ols prepared as described in Example XX hereinabove, the corresponding 21-acetates were obtained. Similarly, by replacing acetic anhydride with the remaining anhydrides used in Example VII hereinabove, the corresponding 21-propionates, cyclopentylpropionates, β-chloropropionates, -butyrates, -caproates and -enanthates, respectively, were obtained.

Example XXII

To a solution of 2.5 grams of B-homo-19-nor-Δ$^{5(10)}$-pregnene-17α,21-diol-3,20-dione in 25 cc. of methylene dichloride, maintained at −5° C., there was added dropwise, over a 30 minute period, with stirring, a solution of 2 grams of bromine in 25 cc. of methylene dichloride. The resulting reaction mixture was allowed to stand at 0° C. for 5 minutes, then poured into an aqueous 5% sodium bicarbonate solution and extracted with methylene dichloride. The thus-obtained extract was washed with water, dried over anhydrous sodium sulfate and evaporated to dryness. Crystallization from acetone/hexane gave B-homo-5α,10β-dibromo-19-nor-pregnane - 17α,21-diol-3,20-dione.

This procedure was then repeated in every detail but one, namely, B-homo-19-nor-Δ$^{5(10)}$-pregnene-17α,21-diol-3,20-dione was replaced by the remaining 21-ol-3,20-diones prepared as described in Example XX hereinabove and Examples XXIV and XXVII hereinbelow. In each case, the corresponding 5α,10β-dibromo steroid, namely, B-homo-5α,10β-dibromo-16α-methyl-19 - nor - pregnane-17α,21-diol-3,20-dione, B-homo-5α,10β - dibromo - 16β-methyl-19-nor-pregnane-17α,21-diol-3,20-dione, B - homo-5α,10β-dibromo-19-nor-pregnane-11β,17α,21 - triol - 3,20-dione, B-homo-5α,10β-dibromo,19-nor-pregnane - 17α,21-diol-3,11,20-trione, B-homo-5α,10β-dibromo-16α - methyl-19-nor-pregnane-11β,17α,21-triol-3,20 - dione, B - homo-5α,10β-dibromo-16β-methyl-19-nor - pregnane - 11β,17α, 21-triol-3,20-dione, B-homo-5α,10β-dibromo-16α-methyl-19-nor-pregnane-17α,21-diol-3,11,20-trione and B-homo-5α,10β-dibromo,16β-methyl-19-nor - pregnane - 17α,21-diol-3,11,20-trione, respectively, was obtained.

Example XXIII

One gram of B-homo-5α,10β-dibromo,19-nor-pregnane-17α,21-diol-3,20-dione was dissolved in 100 ml. of anhydrous redistilled pyridine and the resulting reaction mixture was then allowed to stand at room temperature with stirring overnight. Following this reaction period the reaction mixture was diluted with water and extracted with methylene dichloride/diethyl ether (1:1 by volume). The resulting extract was washed successively with 1 N hydrochloric acid, an aqueous 1 N sodium hydroxide solution, and then with water until neutral. Next, the neutral solution was dried over anhydrous sodium sulfate and evaporated to dryness under vacuum. Recrystallization from acetone gave B-homo-19-nor-Δ$^{4,9(10)}$-pregnadiene-17α,21-diol-3,20-dione.

By repeating this procedure in every detail but one, namely, replacing B-homo-5α,10β-dibromo-19-nor-pregnane,17α,21-diol-3,20-dione with the remaining 5α,10β-dibromo steroids prepared as described in Example XXII hereinabove and Example XXVII hereinbelow, the corresponding Δ$^{4,9(10)}$-dienes, namely, B-homo-16α-methyl-19-nor-Δ$^{4,9(10)}$-pregnadiene-17α,21-diol-3,20-dione, B - homo-16β-methyl-19-nor-Δ$^{4,9(10)}$-pregnadiene-17α,21-diol - 3,20-dione, B-homo-19-nor-Δ$^{4,9(10)}$ - pregnadiene - 11β,17α,21-triol-3,20-dione, B-homo-19-nor-Δ$^{4,9(10)}$-pregnadiene - 17α, 21-diol-3,11,20-trione, B-homo-16α-methyl-19-nor-Δ$^{4,9(10)}$-pregnadiene-11β,17α,21-triol-3,20 - dione, B - homo - 16β-methyl-19-nor-Δ$^{4,9(10)}$ - pregnadiene - 11β,17α,21 - triol-3,20-dione, B-homo-16α-methyl-19 - nor - Δ$^{4,9(10)}$ - pregnadiene-17α,21-diol-3,11,20 - trione and B - homo - 16β-methyl-19-nor-Δ$^{4,9(10)}$-pregnadiene-17α,21 - diol - 3,11,20-trione, respectively, were obtained.

Example XXIV

B-homo-19-nor-Δ$^{5(10)}$-pregnene - 17α,21 - diol - 3,20-dione was incubated with *Cunninghamella bainieri* in the manner described in Example VIII hereinabove, thus giving the corresponding 11β-hydroxy steroid, i.e., B-homo-19-nor-Δ$^{5(10)}$-pregnene-11β,17α,21-triol-3,20-dione.

By replacing B-homo-19-nor-Δ$^{5(10)}$-pregnene - 17α,21-diol-3,20-dione with B-homo-16α-methyl-19 - nor - Δ$^{5(10)}$-pregnene-17α,21-diol-3,20-dione and B-homo-16β-methyl-19-nor-Δ$^{5(10)}$-pregnene-17α,21-diol - 3,20 - dione, respectively, the corresponding 11β-hydroxy steroids were obtained.

Example XXV

B-homo-19-nor-Δ$^{5(10)}$-pregnene-11β,17α,21-triol - 3,20-dione was selectively esterified at the 21-position in the manner described in Example VII hereinabove, thus giving B-homo-19-nor-Δ$^{5(10)}$-pregnene-11β,17α,21-triol - 3,20-dione 21-acetate.

By repeating this procedure using the remaining free 21-ols prepared as described in Example XXIV hereinabove, the corresponding 21-acetates were obtained.

EXAMPLE XXVI

B-homo-19-nor-Δ$^{5(10)}$ - pregnene - 11β,17α,21 - triol-3,20-dione 21-acetate was oxidized using chromium trioxide in pyridine in the manner described in Example I hereinabove, thus giving B-homo-19-nor-Δ$^{5(10)}$-pregnene-17α,21-diol-3,11,20-trione 21-acetate.

By repeating this procedure using the remaining 21-acetates prepared as described in Example XXV hereinabove, the corresponding 11-ones, namely, B-homo-16α-methyl-19-nor-Δ$^{5(10)}$-pregnene - 17α,21 - diol - 3,11,20-trione 21-acetates and B-homo-16β-methyl-19-nor-Δ$^{5(10)}$-pregnene-17α,21-diol-3,11,20-trione 21-acetate, respectively, were obtained.

Example XXVII

B-homo-19-nor-Δ$^{5(10)}$ - pregnene - 17α,21-diol-3,11,20-trione 21-acetate was hydrolyzed using aqueous methanolic potassium hydroxide in the manner described in Example VI hereinabove, thus giving B-homo-19-nor-Δ$^{5(10)}$-pregnene-17α,21-diol-3,11,20-trione.

By repeating this procedure using the remaining 21-acetates prepared as described in Example XXVI hereinabove, the corresponding free 21-ols, namely, B-homo-16α-methyl-19-nor-Δ$^{5(10)}$ - pregnene-17α,21-diol-3,11,20-trione and B-homo-16β-methyl-19-nor-Δ$^{5(10)}$-pregnene-17α,21-diol-3,11,20-trione, respectively, were obtained.

Example XXVIII

B-homo-19-nor-Δ$^{5(10)}$ - pregnene - 17α,21 - diol-3,20-dione was incubated with *Streptomyces roseochromogenus* in the manner described in Example XIII hereinabove, thus giving B-homo-19-nor-Δ$^{5(10)}$-pregnene-16α,17α,21-triol-3,20-dione.

By repeating this procedure using B-homo-Δ$^{5(10)}$-pregnene-11β,17α,21-triol-3,20 - dione and B-homo-19-nor-Δ$^{5(10)}$-pregnene-17α,21-diol-3,11,20-trione, respectively, as the steroid starting materials, the corresponding 16α-hydroxy compounds, namely, B-homo-19-nor-$\Delta^{5(10)}$-pregnene-11β,16α,17α,21-tetrol-3,20-dione, and B-homo-19-nor-$\Delta^{5(10)}$-pregnene-16α,17α,21-triol-3,11,20 - trione, respectively, were obtained.

Example XXIX

B-homo-19-nor-$\Delta^{5(10)}$-pregnene - 16α,17α,21-triol-3,20-dione was reacted with acetone in the presence of a catalytic amount of perchloric acid in the manner described in Example XIV hereinabove, thus giving B-homo-16α,17α-isopropylidenedioxy-19 - nor - $\Delta^{5(10)}$-pregnen-21-ol-3,20-dione.

By repeating this procedure using the remaining 16α,17α-diols prepared as described in Example XXVIII hereinabove, the corresponding acetonides, namely, B-homo-16α,17α-isopropylidenedioxy - 19 - nor-$\Delta^{5(10)}$-pregnene-11β,21-diol-3,20-dione and B-homo - 16α,17α - isopropylidenedioxy-19-nor-$\Delta^{5(10)}$-pregnen-21-ol-3,11,20-trione, respectively, were obtained.

Acylation of the 21-hydroxyl group in each of these acetonides, using the acyl anhydrides listed in Example VII hereinabove, gave the corresponding 21-acetates, -propionates, -cyclopentylpropionates, -β-chloropropionates, -butyrates, -caproates and -enanthates, respectively.

It will be obvious to those skilled in the art that other changes and variations can be made in carrying out the present invention without departing from the spirit and the scope thereof as defined in the appended claims.

I claim:

1. A compound represented by the formula:

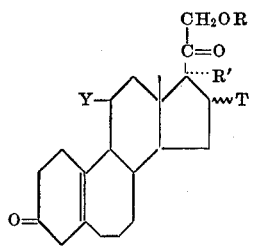

wherein R is selected from the group consisting of hydrogen and a hydrocarbon carboxylic acyl group containing less than 12 carbon atoms; $R^1$ represents hydroxyl; T is selected from the group consisting of hydrogen, α-hydroxyl, α-acyloxy, α-methyl and β-methyl; R and T taken together represent the grouping:

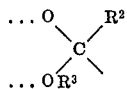

wherein $R^2$ is selected from the group consisting of hydrogen and a lower alkyl group and $R^3$ is selected from the group consisting of hydrogen, a lower alkyl group, and an aryl group containing up to 8 carbon atoms, inclusive, and Y is selected from the group consisting of hydrogen, β-hydroxyl and keto.

2. B-homo-19-nor-$\Delta^{5(10)}$-pregnene - 17α,21 - diol-3,20-dione.

3. B-homo-19-nor-$\Delta^{5(10)}$-pregnene-11β,17α,21-triol-3,20-dione.

4. B-homo-19-nor-$\Delta^{5(10)}$-pregnene - 17α,21-diol-3,11,20-trione.

5. B - homo-16-methyl-19-nor-$\Delta^{5(10)}$-pregnene-11β,17α,21-triol-3,20-dione.

6. B-homo-16-methyl-19-nor-$\Delta^{5(10)}$ - pregnene-17α,21-diol-3,11,20-trione.

7. B-homo-16α,17α - isopropylidenedioxy-19-nor-$\Delta^{5(10)}$-pregnene-11β,21-diol-3,20-dione.

8. A compound represented by the formula:

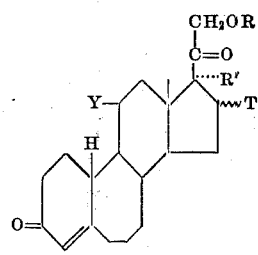

wherein R is selected from the group consisting of hydrogen and a hydrocarbon carboxylic acyl group containing less than 12 carbon atoms; $R^1$ represents hydroxyl; T is selected from the group consisting of hydrogen, α-hydroxyl, α-acyloxy, α-methyl and β-methyl; R and T taken together represent the grouping:

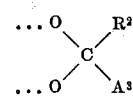

wherein $R^2$ is selected from the group consisting of hydrogen and a lower alkyl group and $R^3$ is selected from the group consisting of hydrogen, a lower alkyl group and an aryl group containing up to 8 carbon atoms, inclusive, and Y is selected from the group consisting of hydrogen, β-hydroxyl and keto.

9. B-homo-19-nor-$\Delta^4$-pregnene-17α,21-diol-3,20-dione.

10. B-homo-19-nor-$\Delta^4$-pregnene - 11β,17α,21-triol-3,20-dione.

11. B - homo - 19 - nor - $\Delta^4$ - pregnene - 17α,21 - diol-3,11,20-trione.

12. B - homo - 16 - methyl - 19 - nor - $\Delta^4$ - pregnene-11β,17α,21-triol-3,20-dione.

13. B - homo - 16 - methyl - 19 - nor - $\Delta^4$ - pregnene-17α,21-diol-3,11,20-trione.

14. B - homo - 16α,17α - isopropylidenedioxy - 19-nor-$\Delta^4$-pregnene-11β,21-diol-3,20-dione.

15. A compound represented by the formula:

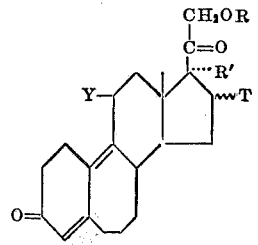

wherein R is selected from the group consisting of hydrogen and a hydrocarbon carboxylic acyl group containing less than 12 carbon atoms; $R^1$ represents hydroxyl; T is selected from the group consisting of hydrogen, α-hydroxyl, α-acyloxy, α-methyl and β-methyl; R and T taken together represent the grouping:

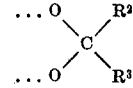

wherein $R^2$ is selected from the group consisting of hydrogen and a lower alkyl group and $R^3$ is selected from the group consisting of hydrogen, a lower alkyl group and an aryl group containing up to 8 carbon atoms, inclusive, and Y is selected from the group consisting of hydrogen, β-hydroxyl and keto.

16. B - homo - 19 - nor - $\Delta^{4,9(10)}$ - pregnadiene - 17α,21-diol-3,20-dione.

17. B - homo - 19 - nor - $\Delta^{4,9(10)}$ - pregnadiene - 11β,17α,21-triol-3,20-dione.

18. B - homo - 19 - nor - $\Delta^{4,9(10)}$ - pregnadiene - 17α,21-diol-3,11,20-trione.

19. B - homo - 16 - methyl - 19 - nor - $\Delta^{4,9(10)}$ - pregnadiene-11β,17α,21-triol-3,20-dione.

20. B - homo - 16 - methyl - 19 - nor - $\Delta^{4,9(10)}$ - pregnadiene-17α,21-diol-3,11,20-trione.

21. B - homo - 16α,17α - isopropylidenedioxy - 19-nor-$\Delta^{4,9(10)}$-pregnadiene-11β,21-diol-3,20-dione.

References Cited

UNITED STATES PATENTS 3,138,635  6/1964  Muller et al. _____ 260—488

OTHER REFERENCES

Carpio et al.: "Journal of Organic Chemistry," vol. 30(12), 1965, pp. 4154–59.

NICHOLAS S. RIZZO, *Primary Examiner.*

J. H. TURNIPSEED, *Assistant Examiner.*